United States Patent [19]

Loucks et al.

[11] 4,154,771
[45] May 15, 1979

[54] PROCESS OF FORMING PHOSPHORUS CONTAINING BLOCK POLYMERS OF POLYPHENYLENE OXIDE

[75] Inventors: George R. Loucks, Scotia; Dwain M. White, Schenectady, both of N.Y.

[73] Assignee: General Electric Company, Schenectady, N.Y.

[21] Appl. No.: 800,647

[22] Filed: May 26, 1977

[51] Int. Cl.$^2$ .................... C08G 65/44; C08G 65/48
[52] U.S. Cl. .................... 260/823; 528/168; 528/169; 528/213
[58] Field of Search .......... 260/823, 47 ET; 528/213, 168, 169

[56] References Cited

U.S. PATENT DOCUMENTS

| | | | |
|---|---|---|---|
| 3,429,850 | 2/1969 | Holoch | 260/45.9 |
| 3,635,890 | 1/1972 | Takemura et al. | 260/47 ET |

Primary Examiner—Lester L. Lee
Attorney, Agent, or Firm—F. Wesley Turner; Joseph T. Cohen; Charles T. Watts

[57] ABSTRACT

A process of forming phosphorus containing linear, branched and/or cross-linked polymers of polyphenylene oxides is described which comprises contacting phosphoryl halides with (a) polyphenylene oxides having an average hydroxyl group per molecule value greter than zero including 1.0 or less, or (b) quinone-coupled polyphenylene oxides having an average hydroxyl group per molecule value greater than zero including 2.0 or less, including mixtures of (a) and (b).

13 Claims, No Drawings

PROCESS OF FORMING PHOSPHORUS CONTAINING BLOCK POLYMERS OF POLYPHENYLENE OXIDE

CROSS REFERENCE TO RELATED APPLICATIONS

This invention is related to subject matter disclosed in our copending U.S. applications, Ser. Nos. 800,645 800,646 and 800,648, all filed on May 26, 1977. All of the aforesaid applications are also our inventions and are assigned to the same assignee as the assignee of this application. All of the disclosures referenced above are incorporated herein in their entirety by reference.

BACKGROUND OF THE INVENTION

1. Field of the Invention

This invention relates to a process of forming phosphorus containing linear, branched, and/or cross-linked polymers of polyphenylene oxides which comprises contacting phosphoryl halides with (a) polyphenylene oxides having an average hydroxyl group per molecule value greater than zero including 1.0 or less, or (b) quinone-coupled polyphenylene oxides having an average hydroxyl group per polymer molecule value greater than zero including 2.0 or less, including mixtures of (a) and (b).

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879, 3,914,266, application Ser. No. 540,473, filed Jan. 13, 1975, a continuation-in-part of Ser. No. 441,295, filed Feb. 11, 1974, now abandoned, and Olander's U.S. Pat. Nos. 3,956,442; 3,965,069; 3,972,851 and Ser. No. 582,910, filed June 2, 1975.

Block polymers of prior art polyphenylene oxides employing simple bifunctional coupling compounds such as diacyl halides, diisocyanates, bis(haloaryl)sulfones are described in White's U.S. Pat. Nos. 3,793,564; 3,770,850 and 3,809,729.

DESCRIPTION OF THE INVENTION

This invention embodies a process of forming phosphorus containing linear, branched, and/or cross-linked polymers of polyphenylene oxides which comprises contacting phosphoryl halides with (a) polyphenylene oxides having an average hydroxyl group per molecule value greater than zero including 1.0 or less, or (b) quinone-coupled polyphenylene oxides having an average hydroxyl group per molecule value greater than zero including 2.0 or less, including mixtures of (a) and (b).

The polyphenylene oxides that are employed in our process can be prepared by any of the methods known to those skilled in the art including those described in the Hay and Olander references noted hereinbefore, as well as the methods of Loucks et al. described in copending U.S. Ser. No. 800,646, filed May 26, 1977. Illustrative polyphenylene oxides are described by the following formulae:

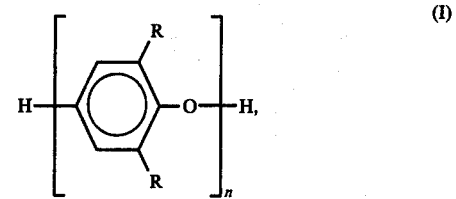

wherein independently each R is hydrogen, a hydrocarbon radical, a halohydrocarbon radical, a hydrocarbonoxy radical or a halohydrocarbonoxy radical, n is a number of at least 10, preferably 40 to 170; and

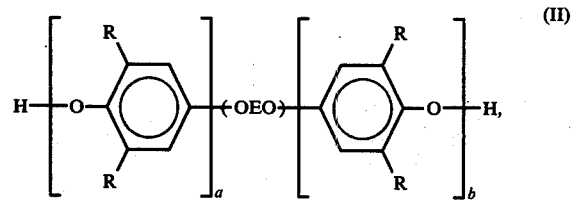

wherein independently each $-\!\!+\!\!OEO\!\!+\!\!-$ is a divalent quinone residue, E is a divalent arene radical, either a or b is at least equal to 1, the sum of a plus b is preferably at least equal to 10, more preferably 40 to 170, and R is the same as defined in formula (I) above.

The phosphoryl halides that are employed in our process have at least two halide coupling reaction sites. The term "phosphoryl halide" includes mono- or polyphosphoryl halides, ortho- or pyrophosphoryl halides, including inorganic or organic members of the above group. Methods for the preparation of phosphoryl di- and trihalides are well-known to those skilled in the art including the oxidation of phosphorus trihalides, the replacement of a halide of a phosphoryl trihalide by an alkyl, cycloalkyl, aryl, etc., group using alcohols and phenols. Illustrative phosphoryl halides are described by the following formulae:

wherein independently Y is selected from alkyl, cycloalkyl, aryl, alkoxy, cycloalkoxy or aryloxy, preferably $C_{1-5}$ alkyl or alkoxy, or a halogen, each X is a halogen, and each p and q is the number 1; and

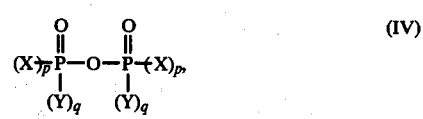

wherein independently each X, Y, p and q are as previously defined.

Illustrative of a portion of presently preferred phosphoryl halides that can be employed are the following:

$POF_2Cl$
$POFCl_2$
$POF_2Br$
$POFBr_2$
$POCl_2Br$
$POClBr_2$
$POCl_3$

POBr₃
POF₃
CH₃POCl₂
n-C₄H₉POCl₂
cyclo-C₆H₁₁POCl₂
C₆H₅POCl₂
p—CH₃—C₆H₅POCl₂
C₆H₅CH₂POCl₂
[(C₆H₅)₃O]POCl₂
CH₃—C—POCl₂
sec-O₄H₉—O—POCl₂
tert-C₄H₉—O—POCl₂
C₁₀H₂₁—O—POCl₂
C₆H₅—O—POCl₂
p-CH₃—C₆H₅—O—POCl₂
C₆H₅CH₂—O—POCl₂

$$Cl_2-\overset{O}{\overset{\|}{P}}-O-\overset{O}{\overset{\|}{P}}-Cl_2$$

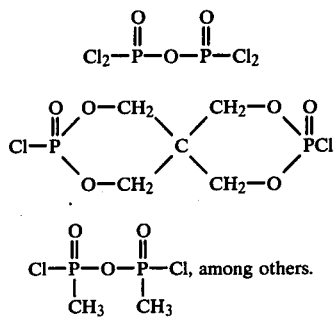

$$Cl-\overset{O}{\overset{\|}{\underset{CH_3}{P}}}-O-\overset{O}{\overset{\|}{\underset{CH_3}{P}}}-Cl, \text{ among others.}$$

Illustrative of the broad group of phosphorus containing polymers of polyphenylene oxides that can be prepared according to our process, among others, are those described by the following illustrative linear, branched and cross-linked polymer structures:

| (V linear) | AZA, AZB, BZB, AZBZA, AZBZB, BZBZB, etc. | | | |
|---|---|---|---|---|
| (V branched) | B<br>AZA, | B A<br>AZBZA, | A A<br>AZBZA,<br>A | etc. |
| (V cross-linked) | AZBZ-<br>BZA,<br>B B<br>AZBZB-<br>ZBZA | AZBZBZ,<br>B<br>AZBZBZA<br>A | etc. | | wherein A represents a monovalent phenoxy residue of a polyphenylene oxide of formula (I), B represents a divalent phenoxy residue of a quinone-coupled polyphenylene oxide of formula (II), and Z represents a di- or a tri-valent phosphoryl residue of a phosphoryl halide of formulae (III) or (IV).

The above illustrative linear branched cross-linked combinations of monovalent phenoxy radicals, divalent phenoxy radicals, and di- and/or tri-functional phosphoryl radicals are not intended to limit the combinations that can be obtained by the practice of this invention since such combinations are limited only by the stoichiometric amounts of the representative precursors of the various radicals charged to the reaction medium in carrying out the process of this invention.

Our process is carried out by introducing a phosphoryl halide to a solution of a quinone-coupled polyphenylene oxide under fluid mixing conditions wherein the solution experiences high fluid shear stress since our process is highly sensitive to the dispersion of the reactants. In a preferred embodiment, the coupling reaction is carried out while introducing the phosphoryl halide to the quinone-coupled polyphenylene oxide solution at a point or region within a reaction environment near a mixing impeller, e.g. an axial-flow or radial flow impeller, such as a marine-type mixing propeller, fan turbine, pitched paddle, curved blade turbine, spiral backswept turbine, flat-blade turbine, gate impeller, anchor impeller, etc., in order to establish and maintain high fluid shear rates and accordingly relatedly high fluid shear stresses. The addition of phosphoryl halide under the aforesaid process conditions facilitates the establishment and maintenance of a substantially uniform dispersion of reactants, phosphoryl halide, quinone-coupled polyphenylene oxide, water soluble base, and catalytic phase transfer agent, and accordingly optimum process efficiency. In general, high-speed axial-flow impeller mixers are presently preferably in our process.

Advantageously and preferably, our process can be carried out employing substantially the exact stoichiometric amounts of phosphoryl halide required to completely couple essentially all of the quinone-coupled polyphenylene oxide reactant while obtaining optimum increases in the phosphoryl coupled quinone-coupled polyphenylene oxide intrinsic viscosity. Preferably the phosphoryl halide is added to the reaction medium continuously during the course of the reaction so that the exact stoichiometric phosphoryl halide requirements for completion of the coupling reaction are only satisfied as the last portion of phosphoryl halide is added to the reaction medium.

In a preferred embodiment, our process is carried out in the substantial absence of any hydrolyzing agent, e.g. water methanol, etc., or other chemical constituents which can promote undesirable side reactions, such as primary or secondary amines. Accordingly, it is highly desirable that the individual and preferably the collective water, methanol, etc., primary and secondary amine content be limited to less than 1%, and more preferably less than ½% based on the weight of quinone-coupled polyphenylene oxide reactant.

The phosphoryl halide coupling reaction is carried out in the presence of water soluble base, preferably in solution in an aqueous phase. The water soluble base can be any water soluble base which, in the presence of polyphenylene oxides, can convert substantially all of the hydroxy groups associated therewith to phenoxides, i.e. alkali metal or alkaline earth metal cation phenoxides or "onium" phenoxides derived from catalytic phase transfer agents described in greater detail herein. Further illustrative of the bases that can be employed are alkali metal or alkaline earth metal hydroxides and carbonates, e.g. potassium hydroxide, sodium hydroxide, sodium monocarbonate, barium carbonate, etc. In general, any amount of water soluble base can be employed, e.g. 0.1 to about 1000, preferably 1 to about 20, and more preferably 1.5 to about 5 moles of base per hydroxyl group associated with the polymers as identified by hydroxyl group infrared absorption at 3610 cm.⁻¹ based on a 2.5% solution in a CS₂ over a 1 cm. path calibrated against CS₂ in a matched cell. Further, preferably, the water soluble base is employed in solution in an aqueous phase wherein the water soluble base content is at least 10% and more preferably at least 25-50% by weight of the aqueous base solution. Preferably the phosphoryl halide coupling reaction is carried out in the presence of a catalytic phase transfer agent.

The agent can be any phase transfer agent known to those skilled in the art, e.g. quaternary ammonium compounds, quaternary phosphonium, tertiary sulfonium compounds, etc., including mixtures thereof. Presently preferred phase transfer agents can be described by the formulae:

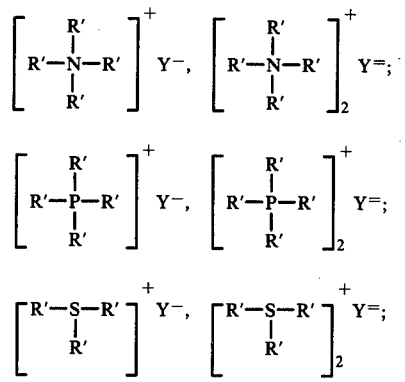

wherein each R' is independently selected from aliphatic hydrocarbon radicals having from about 1 to about 30 carbon atoms, preferably from about 2 to about 15 carbon atoms, each $Y^-$ is selected from the group consisting of $Cl^-$, $Br^-$, $F^-$, $CH_3SO_3^-$, $CH_3CO_2^-$, $CF_3CO_2^-$ or $OH^{--}$, and each $Y^{--}$ is selected from the group consisting of $SO_4^{--}$, $CO_3^{--}$, or $C_2O_4^{--}$. The catalytic phase transfer agents can also be employed in any amount, e.g. in amounts of from 0.001 to 10, preferably from 0.01 to 1.0, and more preferably from 0.05 to 0.5 moles based on the molar amounts of hydroxyl groups associated with the polymer.

Broadly, reaction time can be any time, e.g. 1/10 hour or less, to 10 hours, or more. Broadly, the reaction temperature can be any temperature, e.g. 0° C. or less to 150° C. or more. Broadly, the reaction pressures can be any pressure, e.g. subatmospheric, atmospheric or superatmospheric. Preferably, the reaction is carried out under optimum time, temperature and pressure reaction conditions which integrates substantially all, e.g. 90-99% or more of the phosphoryl halide contained within the reaction medium into the polymer backbone during the process. Broadly, the phosphoryl-coupled quinone-coupled polyphenylene oxides can be isolated from the reaction medium by any means employed heretofore to isolate the polymer produced by the processing of Hay and Orlander. Preferably, the products of our process are isolated from the reaction medium by spray drying, steam precipitation or any other method which avoid costly distillation procedures involving the separation by distillation of mixed solvents.

EXAMPLE I

(A) Polymer Preparation

A 2.5 gallon stainless steel reactor equipped with an air-driven paddle stirrer, oxygen inlet tube, and water-cooled coil and jacket was charged with 4.9 l. toluene, 151.5 ml. of a catalyst stock solution (29.5 ml. bromine added slowly to a chilled solution of 7.76 g. cuprous oxide and 132.0 g. 2,6-xylenol (also known as 2,6-dimethylphenol) in methanol, diluted with toluene to 1.0 l.), 5.64 g. N,N'-di-t-butylethylenediamine (DBEDA), 33.2 g. N,N-dimethylbutylamine (DMBA), and 20.0 g. di-n-butylamine (DBA). Oxygen was bubbled through the reaction medium at a rate of 10 SCFH and vigorous mixing. 2000 g. 2,6-xylenol in 2.0 l. of toluene was pumped into the reactor over a 30-minute period. Summarily, the reaction parameters relative to molar ratios of 2,6-xylenol:Cu:DBEDA:DMBA:Br:DBA were as follows: 1000:1:2:20:8:9.4.

(B) Deactivation Catalyst System

The reaction was terminated after 45 minutes (from start of monomer addition) by replacing oxygen with nitrogen and the addition of 20.0 ml. 38% Na₃EDTA in water. Polymer analysis showed: [η] 0.30 dl./g.; 3,3',5,5'-tetramethyl-1,4-diphenoquinone (TMDQ) equal to 0.76% by weight based on the weight of 2,6-xylenol.

(C) Quinone Coupling Reactions (1) The TMDQ containing reaction mixture washed with an equal volume of warm water (ca. 50° C.) and passed through a Westphalia liquid-liquid centrifuge to remove the aqueous phase which contained copper salts and a portion of the amine. Methanol (2.5 volumes) was added slowly with stirring to half of the centrifuged reaction mixture to precipitate the polymer. A portion of the quinone reacted polymer was collected on a filter, washed with metahnol and dried in a circulating air oven at 80° C. Polymer analysis showed an intrinsic viscosity [η] equal to 0.25 dl./g.

(2) The remaining half of the water washed quinone reacted polymer (approximately 1000 g.) was heated under nitrogen at 95° C. for 15 minutes. The yellow color characteristically associated with free quinone (quinone unreacted with polymer) associated with the quinone reacted polymer decreased to a very low color intensity. Polymer analysis showed an intrinsic viscosity [η] equal to 0.26 dl./g.

(D) Phosphorus Coupling Quinone-Coupled Polymer

Half of the polymer solution was cooled to 60° C. in the 2.5 gallon reactor, 5.0 g. Aliquat ®336 and 73.2 g. 50% aqueous NaOH were charged into the reactor and the mixture was stirred vigorously (under N₂) for 2 minutes. 11.2 ml. POCl₃ (in 150 ml. toluene) was then added over a 15 minute period (60° C. temperature and vigorous stirring maintained), being delivered through the oxygen inlet tube to a point just above the tip of the stirrer blade. The viscous light tan solution was neutralized with acetic acid. The coupling reaction was repeated on the remaining polymer solution. Both solutions were combined to ensure uniformity.

(E) Isolation of Phosphorus Coupled Quinone Coupled Polymer (1) One half of the resulting phosphorus containing polymer was isolated in pelletized form by steam precipitation of half of the combined coupled polymer solution of (η). In this step the solution was sprayed through an orifice with steam into a tank of stirred hot water at such a rate as to remove volatiles azeotropically and allow the solids to coalesce into granules. The polymer was dried at 95°-100° C. Polymer analysis showed an intrinsic viscosity [η] equal to 0.64 dl./g.

(2) The remaining half of the phosphorus containing coupled polymer solution was isolated by dilution with toluene to 15% solids followed by precipitation by the gradual addition of a three-fold excess of methanol. The polymer was collected on a Buchner funnel, washed with methanol and dried. Polymer analysis showed an intrinsic viscosity equal to 0.62 dl./g. Both polymers were blended with polystyrene. and the associated properties are summarized in Table II(d), also set out hereafter.

TABLE II(a)

| | | Polymer Processing Stages | | | |
|---|---|---|---|---|---|
| Run No. | Polymer Preparation Catalyst[a] System | Quinone Coupling Temp. Range °C. | Phosphorus Coupling Temp. Range °C. | Isolation Techniques Methanol | Steam Ppt. |
| 1 | Copper/Diamine | 50-85°±5° | 60° | x | |
| 2 | ↓ | ↓ 95 | 60 | x | |
| 3 | ↓ | ↓ 95 | 60 | x | |
| 4 | ↓ | ↓ 95 | 60 | x | |
| 5 | ↓ ↓ 95 | 60 | | x | |
| 6 | ↓ | ↓ 95 | 60 | x | |
| 7 | ↓ | ↓ 95 | 60 | x | |
| 8 | ↓ | ↓ 95 | 60 | | x |
| 9 | ↓ (b) | ↓ 95(b) | 60 | x | |
| 10 | ↓ (b) | ↓ 95(b) | 60 | x | |
| 11 | ↓ (b) | ↓ 95(b) | 60 | | x |
| 12 | ↓ | ↓ 95 | 60 | x | |
| 13 | ↓ | ↓ 95 | 60 | | x |
| 14 | ↓ | ↓ 95 | 60 | x | |
| 15 | ↓ | ↓ 60 | 60 | x | |
| 16 | ↓ | 50 | 50 | x | |
| 17 | Copper/Diamine/No MeOH | 50 | 50 | | x |
| 18 | ↓ (c) | 60 | 60 | x | |
| 19 | ↓ (c) | 60 | 60 | x | |
| 20 | Mn/oxime | 60 | 60 | x | |
| 21 | ↓ | 95 | 60 | x | |

[a]Catalyst compositions contained 1% DBA and 6% methanol (MeOH) based on the weight of 2,6-xylenol. Molar ratios 2,6-xylenol:Cu-DBEDA:DMBA were as follows: 1000:1:2:20.
[b]0.5% DBA added during polymer preparation, and 0.5% DBA added during quinone coupling.
[c]Aliquat 336 present during polymerization.
[d]Mn(II) benzoinoxime chelate catalyst (U.S. 3,956,242).

(E) Phosphorus Containing Polymers Blended with Polystyrene

The polymers isolated in (E) (1) and (2) above were blended with high impact polystyrene accordingly: 50 parts of poly(phenylene oxide), 50 parts of high impact polystyrene, plus minor amounts, e.g. less than 10 parts, of stabilizing additives. The blends were compounded on a Werner and Pfleiderer K-28 twin screw extruder at a temperature range from 260° to 293° C. and at rate of 15 pounds per hour. Extruded samples were air dried 2 hours at 125° C. and molded on a Battenfield Injection Molding machine (2.8 oz. shot size) having a 510° F. barrel temperature, a 180° F. mold surface temperature, an 8 sec. injection time, and an 8000 psi injection pressure.

The impact strengths on prenotched bars of the polymer blends are listed hereafter:

| Isolation Procedure | Notched Izod Impact (ASTM D256) |
|---|---|
| Steam precipitated | 4.2 ft.lbs./in. notch |
| Methanol precipitated | 4.3 ft.lbs./in. notch |

Tensile tests showed the samples to be ductile and equivalent to commercial material in tensile strength.

EXAMPLE II

A series of phosphorus containing polyphenylene oxides were prepared employing various polymerization reactions, quinone and phosphorus coupling reactions, as well as polymer isolation techniques. The temperatures, intrinsic viscosities and hydroxyl contents associated with the reactions and isolation procedures are summarized in Tables II(a), (b) and (c) hereafter. The physical properties of the phosphorus coupled polymers when blended with polystyrene were evaluated for impact, heat distortion and nitrogen content

TABLE II(b)

| | Intrinsic Viscosity [η] at Associated Polymer Processing Stages, | | | |
|---|---|---|---|---|
| .28 No. | Initial Polymer[1] | Quinone Coupled[1] | Phosphorus Coupled[1] | Phosphorus Coupled[2] |
| 1 | .32 | .27 | .61 | .64 |
| 2 | .36 | .34 | .64 | .68 |
| 3 | .36 | .34 | .65 | .74 |
| 4 | .30 | .26 | .62 | .61 |
| 5 | .30 | .26 | .64 | .61 |
| 6 | .30 | .26 | .62 | .62 |
| 7 | .31 | .27 | .63 | .63 |
| 8 | .31 | .27 | .68 | .61 |
| 9 | .29 | .26 | .64 | .62 |
| 10 | .29 | .27 | .65 | .61 |
| 11 | .29 | .27 | .63 | .60 |
| 12 | .31 | .27 | .69 | .67 |
| 13 | .31 | .27 | .66 | .64 |
| 14 | .30 | .27 | .61 | .61 |
| 15 | .30 | .26 | .58 | .58 |
| 16 | 128 | .25 | .55 | .57 |
| 17 | .28 | .25 | .57 | .54 |
| 18 | .31 | .26 | .53 | .55 |
| 19 | .33 | .29 | .50 | .51 |
| 20 | .33 | .29 | .55 | .56 |
| 21 | .34 | .27 | .56 | .60 |

[1]I.V. of polymer powder measured in chloroform at 25° C.
[2]I.V. of polymer film compression molded (2 minutes at 270° C. having film thickness of 5–10 mils) measured in chloroform at 25° C.

TABLE II(c)

| | Isolated Polyemer [OH] Absorption at 3610 cm.$^{-1}$ At Associated Polymer Processing Stages | | |
|---|---|---|---|
| Run No. | Initial Polymer | Quinone Coupled | Phosphorus Coupled |
| 1 | .135 | .263 | .002 |
| 2 | .113 | .204 | .000 |
| 3 | .113 | .183 | .000 |
| 4 | .161 | .249 | .002 |
| 5 | .161 | .249 | .006 |
| 6 | .161 | .249 | .002 |
| 7 | .119 | .220 | .005 |
| 8 | .119 | .220 | .005 |

TABLE II(c)-continued

Isolated Polyemer [OH] Absorption at 3610 cm.$^{-1}$ At Associated Polymer Processing Stages

| Run No. | Initial Polymer | Quinone Coupled | Phosphorus Coupled |
|---|---|---|---|
| 9 | .174 | .262 | .003 |
| 10 | .166 | .256 | .000 |
| 11 | .166 | .256 | .005 |
| 12 | .132 | .231 | .004 |
| 13 | .132 | .231 | .004 |
| 14 | .191 | .254 | .002 |
| 15 | .175 | .270 | .075 |
| 16 | .196 | .265 | .007 |
| 17 | .196 | .265 | .004 |
| 18 | .161 | .257 | .002 |
| 19 | .118 | .220 | .012 |
| 20 | .118 | .220 | .006 |
| 21 | .247 | .328 | .035 |

TABLE II(d)

Physical Properties of Polyphenylene Oxide Polystyrene Blends After Phosphorus Coupling and Polymer Isolation

| Run No. | Impact Izod[2] | Impact Gardner[3] | HDT °C.[4] | N ppm.[5] |
|---|---|---|---|---|
| 1 | 4.8(5.3) | 140 | 110 | 1100 |
| 2 | 4.1 ↓ | 132 | 112 | 920 |
| 3 | 4.4 ↓ | 148 | 112 | 977 |
| 4 | 4.3 ↓ | 160 | 113 | 859 |
| 5 | 4.2 ↓ | 120 | 115 | 1035 |
| 6 | 4.5 ↓ | 200 | 110 | 865 |
| 7 | 4.4 ↓ | 164 | 106 | 952 |
| 8 | 3.7 ↓ | 140 | 110 | 1298 |
| 9 | 4.9(5.7) | 168 | 110 | 979 |
| 10 | 5.2 ↓ | 164 | 107 | 949 |
| 11 | 4.5 ↓ | 156 | 111 | 1083 |
| 12 | 5.5 ↓ | 220 | 111 | 886 |
| 13 | 4.8 ↓ | 172 | 111 | 1178 |
| 14 | 5.1 ↓ | 200 | 106 | 801 |
| 15 | 5.8 ↓ | 172 | 109 | 981 |
| 16 | 4.7 ↓ | n.d. | 106 | 1040 |
| 17 | 4.4 ↓ | ↓ | 106 | 1247 |
| 18 | 4.7 ↓ | ↓ | 107 | 1192 |
| 19 | 4.6 ↓ | ↓ | n.d. | 1094 |
| 20 | 5.2 ↓ | ↓ | ↓ | 1080 |
| 21 | 4.1(5.5) | ↓ | ↓ | 913 |

[2]Izod Impact Strength, ASTM Test D256, method A measured in ft-lbs/in of notch - number in parenthesis is impact value for commercial Noryl resin.
[3]Gardner Impact Strength, ct ASTM D2794-69
[4]HDT, ASMT test D, heat distortion temperature in °C.
[5]N/ppm., Analysis for chemical bound nitrogen by Kjeldahl method.

EXAMPLE III

(A) Polymer Preparation 24.4 g. of 2,6-xylenol was added to a stirred solution of 94 ml. of toluene, 0.228 g. N,N-dimethylbutylamine, i.e. DMBA, 0.099 g. of equal molar quantities of cupric bromide and DBEDA, i.e. $CuBr_2 \cdot (t\text{---}C_4H_9\text{---}NHCH_2CH_2\text{---}NH\text{---}t\text{---}C_4H_9)$, 0.10 g. of 4-bromo-2,6-xylenol, in a stirred 25° C. constant temperature bath while oxygen was bubbled in at 0.5 SCFH. After 55 minutes a small sample was removed, precipitated with methanol, washed and dried. Polymer analysis showed an intrinsic viscosity [η] equal to 0.24 dl./g.

(B) Catalyst Deactivation, and (C) Quinone Coupling

The remaining mixture was stirred under nitrogen, 1.13 ml. of 10% Aliquat ®336 in toluene and 2.3 g. 50% aqueous sodium hydroxide were added and the mixture was stirred with a Vibromixer for 30 minutes. A small sample of polymer was removed and isolated as above. Polymer analysis showed an intrinsic viscosity [η] equal to 0.29 dl./g.

(D) Phosphorus Coupling

To the remainder of the polymer solution, 0.115 g. $POCl_3$ was added over a 50 minute period and the resulting polymer was isolated as above. Polymer analysis showed an intrinsic viscosity [η] equal to 0.42 dl./g.

EXAMPLE IV

Poly(2,6-dimethyl-1,4-phenyleneoxide) having an intrinsic viscosity of 0.33 dl./g. was prepared as in Example III above and isolated by methanol precipitation, washed and dried. 2.44 grams of the polymer was dissolved in 8.2 ml. chlorobenzene, 0.12 ml. of the 10% solution by weight of Aliquat ® 336 in toluene plus 90 ml. of a 50% aqueous sodium hydroxide solution were added to the polymer solution while agitating the mixture over a 30 minute period. 0.020 g. of $POCl_3$ was added over a subsequent 10 minute interval and the resulting phosphorus coupled polymer was isolated by methanol precipitation, washed and dried. Polymer analysis showed intrinsic viscosity [η] equal to 0.72 dl./g. Hydroxyl [OH] absorbance of the initial polymer as prepared in Example III at 3610 cm.$^{-1}$ was 0.18 units while the hydroxyl absorbance value of the phosphorus coupling was 0.016 units.

EXAMPLE V

Example IV above was repeated with the exception that the phosphoryl halide, $POCl_3$, quantity was diminished, i.e. 0.010 g. of $POCl_3$ was added over a 10 minute period as opposed to 0.020 g. as described in Example IV. The 0.010 g. amount of $POCl_3$ corresponded to the theoretical chemical equivalent amount of $POCl_3$ required to completely couple with the quinone coupled polymer based on the hydroxyl absorbance value of 0.18 units. Polymer analysis—prior to phosphorus coupling—showed an intrinsic viscosity [η] equal to 0.33 dl./g. and an OH absorbance of 0.18 units, and—after phosphorus coupling—showed an intrinsic viscosity [η] equal to 0.70 dl./g. and an OH absorbance of 0.015 units.

As illustrated by the foregoing examples, phosphoryl halides can be reacted with polyphenylene oxides under widely varying reaction conditions to form phosphorus containing polyphenylene oxides.

As also illustrated, phosphorus containing polymers of polyphenylene oxide can be formed having an intrinsic viscosity of from about 0.42 to 0.72 as measured in chloroform at 25° C. Any number average molecular weight $\overline{M}_n$ polymer can be prepared by our process. Presently preferred polymers generally have an $\overline{M}_n$ value of 5,000 to 60,000, more preferably 15,000 to 30,000, having generally corresponding intrinsic viscosities of 0.17 to 1.7, and 0.4 to 0.7, respectively.

The polymers of this invention can be combined with other fillers, modifying agents, etc., such as dies, pigments, stabilizers, flame retardant additives with beneficial results.

We claim:

1. A process of forming phosphorus containing polymers of polyphenylene oxide which comprises contacting in a high fluid shear stress reaction medium phosphoryl halides with (a) polyphenylene oxides having an average hydroxyl group per molecule value greater than zero including 1.0 or less, or (b) quinone-coupled polyphenylene oxides having an average hydroxyl group per molecule value greater than zero including 2.0 or less, including mixtures thereof of (a) and (b).

2. A process of forming phosphorous containing polymers of polyphenylene oxide which comprises contacting in a high fluid shear stress reaction medium (I) phosphoryl halides of the formulae:

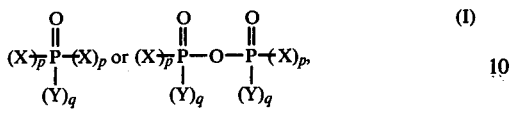

and mixtures thereof wherein Y is selected from alkyl, cycloalkyl, aryl, alkoxy, cycloalkoxy or aryloxy, or a halogen, each X is a halogen, each p and q is the number 1, with (II) a polyphenylene oxide having an average hydroxyl group per molecule value greater than zero including 1.0 or less of the formula

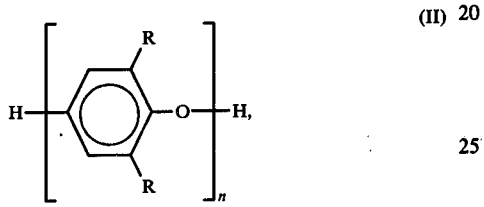

wherein independently each R is hydrogen, a hydrocarbon radical, a halohydrocarbon radical, a hydrocarbonoxy radical or a halohydrocarbonoxy radical, n is a number of at least 10, and/or (III) quinone-coupled polyphenylene oxide having an average hydroxyl group per molecule value greater than zero including 2.0 or less of the formula

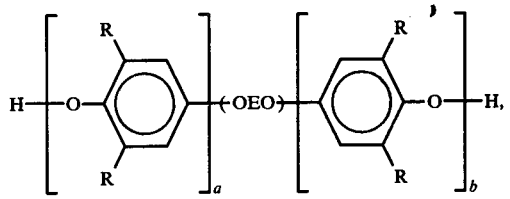

wherein R is as defined above, either a or b is at least equal to 1, the sum of a plus b is at least equal to 10, (OEO) is a divalent quinone residue, and E is a divalent arene radical.

3. The claim 2 process, wherein $-(OEO)-$ is of the formula

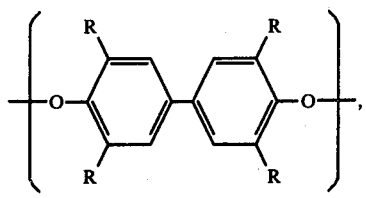

wherein independently each R is as defined hereinbefore.

4. The claim 3 process, wherein n is at least 10, and the sum of a plus b is at least 10.

5. The claim 4 process, wherein each R is hydrogen, a hydrocarbon, or a halohydrocarbon radical, n is a number of from 40 to 170 and the sum of a plus b is 40 to 170.

6. The claim 5 process, wherein each R is a methyl radical.

7. The claim 2 process, carried out in the substantial absence of a hydrolyzing agent.

8. The claim 2 process, carried out in the presence of water soluble base.

9. The claim 8 process, carried out in the presence of a catalytic phase transfer agent.

10. A claim 6 process wherein substantially the exact stoichiometric amount of phosphoryl halide required to completely couple essentially all of the quinone-coupled polyphenylene oxide is present.

11. The claim 10 process wherein the phosphoryl halide is added substantially continuously during the course of the reaction so that the exact stoichiometric phosphoryl halide requirement for completion of the coupling reaction is only satisfied as the last portion of the phosphoryl halide is added to the reaction medium.

12. The claim 11 process carried out in the substantial absence of any hydrolyzing agent.

13. The claim 12 process wherein the reaction medium contains less than about 1% by weight hydrolyzing agent based on the weight of quinone-coupled polyphenylene oxide reactant.

* * * * *